Jan. 29, 1924. 1,481,957
I. W. CEDERBERG
APPARATUS FOR CARRYING OUT HIGHLY EXOTHERMIC CATALYTIC REACTIONS BETWEEN
GASES, PARTICULARLY CATALYTIC OXIDATION OF AMMONIA WITH OXYGEN
Filed July 7, 1923
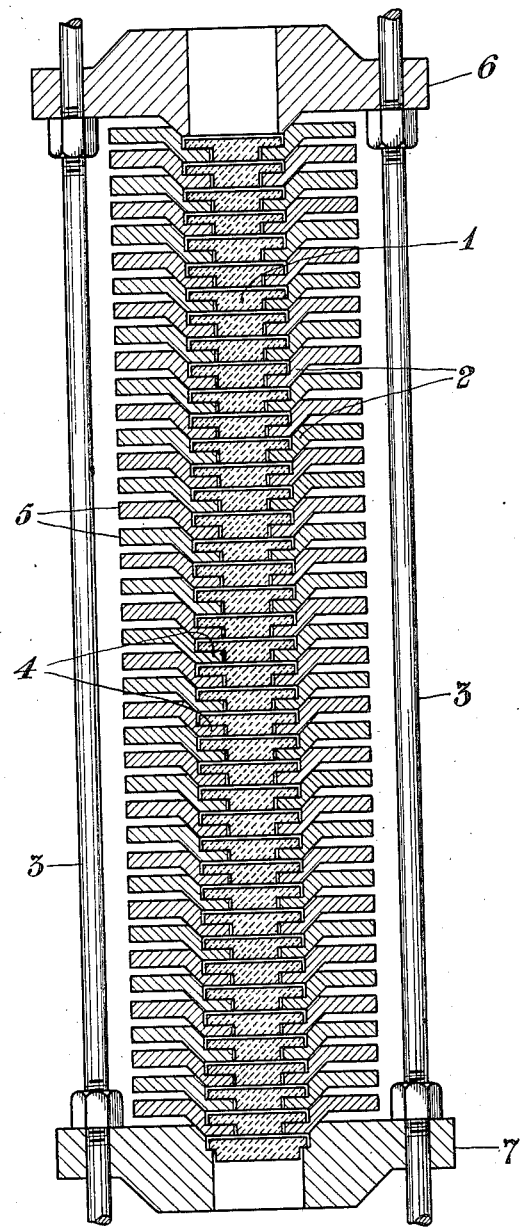
Inventor:
Ivar Walfrid Cederberg
By George Bayard Jones
Atty.

Patented Jan. 29, 1924.

1,481,957

UNITED STATES PATENT OFFICE.

IVAR WALFRID CEDERBERG, OF BERLIN-STEGLITZ, GERMANY, ASSIGNOR OF SEVEN-TENTHS TO HELGE MATTIAS BÄCKSTRÖM, OF DJURSHOLM, SWEDEN.

APPARATUS FOR CARRYING OUT HIGHLY-EXOTHERMIC CATALYTIC REACTIONS BE-TWEEN GASES, PARTICULARLY CATALYTIC OXIDATION OF AMMONIA WITH OXYGEN.

Application filed July 7, 1923. Serial No. 649,979.

*To all whom it may concern:*

Be it known that I, IVAR WALFRID CEDERBERG, a subject of the King of Sweden, residing at Berlin-Steglitz, Germany, have invented a new and useful improvement in apparatus for carrying out highly-exothermic catalytic reactions between gases, particularly catalytic oxidation of ammonia with oxygen, of which the following is a specification.

When carrying out highly exothermic catalytic reactions between gases on a technical scale it is often advantageous that the catalyst zone be divided into a great number of contact units separated from one another, as for instance in the production of sulphuric oxide according to the so-called contact process, in the combustion of ammonia-oxygen mixtures, and in various other reactions. In said case it is possible to obtain within the catalyst zone a distribution of temperature favourable for the progress of the reaction by variation of the activity of the various contact units and by controllable cooling of the same, and in addition an eventual compression of the contact substance and thus a hampered passage for the gases are avoided. When the contact zone consists of a great number of porous plates as contact carriers, difficulties are met with, however, in providing a suitable construction of the catalyzation apparatus, partly in view of the fact that a portion of the gas mixture evades reaction by passing through the space between the contact plates and the wall of the surrounding cylinder, which space increases with the heat of the apparatus, and partly in view of the fact that it is difficult to effect an efficient cooling of the contact plates owing to bad conduction of heat.

The present invention relates to an apparatus for carrying out highly exothermic catalytic reactions between gases by the use of which apparatus the inconveniences above referred to are avoided and other important advantages are attained.

The construction of the apparatus is illustrated in the accompanying drawing which shows the various parts of the apparatus in longitudinal section.

The catalyst zone which consists of a great number of porous plates 1 of for instance pumice-stone with finely divided platinum precipitated thereon, is located in a tubular catalyst chamber which consists of a series of metal rings 2 of such shape that when pressed together by means of screw bolts 3 and nuts, not shown in the drawing, they will fit tightly. Said rings 2 are suitably of such shape that when assembled with their preferably conical tightening faces against one another they will form annular flanges 4 and 5 within as well as around the catalyst chamber. The first and last rings 6 and 7 of the series are made heavier and are provided with apertures for the bolts 3, and the shape and size of the same are suited to the corresponding flanges on the gas inlet and gas outlet tubes. In the inner spaces between the various rings of the series the contact plates 1 are located which have a shape suited for this purpose.

By the use of the apparatus above described the disadvantages referred to in the opening paragraph are avoided. The portion of the gas mixture which tries to pass around the contact plates 1 must incessantly change direction and will in this manner come in an intimate contact with the broad upper portion of the plates. The excess heat of reaction is conducted away without difficulty through the metal rings 2, from which the radiation of heat is exceedingly great and also easily controllable owing to the particular shape of said rings. The advantage is further attained that each contact plate may easily be exchanged owing to the fact that the catalyst chamber may be taken to pieces, which is important for instance when using contact plates of varying activity.

The apparatus described is particularly adapted for the combustion of ammonia-oxygen mixtures. In this case aluminium, or a nickel alloy capable of withstanding the action of nitrous gases, is preferably used as material for the apparatus.

I claim:

1. An apparatus for carrying out highly exothermic catalytic reactions between gases, particularly catalytic oxidation of ammonia with oxygen, in which the catalyst chamber consists of a series of metal rings which when pressed together fit gas-tight to one another.

2. An apparatus for carrying out highly exothermic catalytic reactions between gases, particularly catalytic oxidation of ammonia with oxygen, in which the catalyst chamber consists of a series of metal rings which when pressed together fit gas-tight to one another, said rings having such shape that when assembled they form annular flanges within as well as around the outside of the catalyst chamber.

3. An apparatus for carrying out highly exothermic catalytic reactions between gases, particularly catalytic oxidation of ammonia with oxygen, in which the catalyst chamber consists of a series of metal rings which when pressed together fit gas-tight to one another, said rings having such shape that when assembled they form annular flanges within as well as around the outside of the catalyst chamber and having conical tightening faces adapted to bear against one another when assembling the rings.

IVAR WALFRID CEDERBERG.